United States Patent [19]

Kato et al.

[11] Patent Number: 4,953,108

[45] Date of Patent: Aug. 28, 1990

[54] DOCUMENT PROCESSOR HAVING A DOCUMENT COMPOSITION FUNCTION

[75] Inventors: Takahiro Kato; Masaki Hamada, both of Tokyo; Hiroshi Takakura, Yokohama; Yukari Shibuya, Kawasaki, all of Japan

[73] Assignee: Canon Kabushiki Kaisha, Tokyo, Japan

[21] Appl. No.: 72,634

[22] Filed: Jul. 13, 1987

[30] Foreign Application Priority Data

Jul. 15, 1986 [JP] Japan .................................. 61-165996
Jul. 15, 1986 [JP] Japan .................................. 61-165997
Jul. 15, 1986 [JP] Japan .................................. 61-165998
Jul. 15, 1986 [JP] Japan .................................. 61-165999

[51] Int. Cl.$^5$ ............................................. G06F 3/14
[52] U.S. Cl. ..................................... 364/523; 364/900
[58] Field of Search ............... 364/518, 521, 900, 523; 340/721, 723, 747, 749

[56] References Cited

U.S. PATENT DOCUMENTS

| 4,195,338 | 3/1980 | Freeman | 364/200 |
|---|---|---|---|
| 4,506,343 | 3/1985 | Shipp, Jr. et al. | 364/900 |
| 4,608,662 | 8/1986 | Watanabe et al. | 364/900 |
| 4,608,664 | 8/1986 | Bartlett et al. | 364/900 |
| 4,649,513 | 3/1987 | Martin et al. | 364/900 |
| 4,713,754 | 12/1987 | Agarwal et al. | 364/200 |

Primary Examiner—Gary V. Harkcom
Assistant Examiner—H. R. Herndon
Attorney, Agent, or Firm—Fitzpatrick, Cella, Harper & Scinto

[57] ABSTRACT

A document processor receives a document prepared by a different type of device, recognizes and registers a table in the document. It composes and outputs a document with the original form of the table being maintained.

13 Claims, 5 Drawing Sheets

| JiSC 6226 | | JiSC 6226 | | JiSC 6226 | |
|---|---|---|---|---|---|
| 8/1 | — | 8/5 | ⌋ | 8/9 | ⊣ |
| 8/2 | │ | 8/6 | ⌊ | 8/10 | ⊥ |
| 8/3 | ⌈ | 8/7 | ⊢ | 8/11 | ┼ |
| 8/4 | ⌉ | 8/8 | ⊤ | | |

RTB

| NO. OF DINES | | | | | | |
|---|---|---|---|---|---|---|
| 1ST LINE, y-COORDINATES | x-COORDINATES OF LEFT EDGE | x-COORDINATES OF RIGHT EDGE | LINE TYPE | 2ND LINE, y-COORDINATES | x-COORDINATES OF LEFT EDGE | ... |

CTB

| NO. OF DINES | | | | | | |
|---|---|---|---|---|---|---|
| 1ST LINE, x-COORDINATES | y-COORDINATES OF TOP EDGE | y-COORDINATES OF BOTTOM EDGE | LINE TYPE | 2ND LINE, x-COORDINATES | y-COORDINATES OF TOP EDGE | ... |

*FIG. 5(a)*

CELL

| NO. OF CELLS | | | | | | | |
|---|---|---|---|---|---|---|---|
| 1ST CELL, x-COORDINATES OF LEFT-HAND TOP EDGE | y-COORDINATES OF LEFT-HAND TOP EDGE | x-COORDINATES OF RIGHT-HAND BOTTOM EDGE | y-COORDINATES OF RIGHT-HAND BOTTOM EDGE | POINTER FOR CHARACTER TRAIN | ATTRIBUTES (COLUMN LAYOUT, TYPE SIZE, FONT TYPE, JUSTIFICATION, ALIGNMENT, LINE PITCH, CHARACTER PITCH) | 2ND CELL, x-COORDINATES OF LEFT HAND TOP EDGE | --- |

CHARACTER TRAIN IN 1ST CELL

CHARACTER TRAIN IN 2ND CELL

| 日本語 | 英　語 |
|---|---|
| 頭文字 | INITIAL |
| 頭文字 | INITIAL |

| 日本語 | 英　語 |
|---|---|
| 頭文字 | INITIAL |
| 頭文字 | INITIAL |

頭文字　　INITIAL

頭文字　　INITIAL

| 日本語 | 英　語 |
|---|---|
| 頭文字 | INITIAL |
| 頭文字 | INITIAL |

| 日本語 | 英　語 |
|---|---|
| 頭文字 | INITIAL |
| 文字 | INITIAL |

頭

ここは本
文です。ここは本文です。こ
こは本文です。ここ

DOCUMENT PROCESSOR HAVING A DOCUMENT COMPOSITION FUNCTION

BACKGROUND OF THE INVENTION

1. Field of the Invention

This invention relates to a document processor having a function of composing a document.

2. Related Background Art

Conventionally, a simple document processor called a word processor, especially a Japanese word processor, processes any characters at a fixed pitch, so that a train of alphabet characters or a train of Japanese Kana and/or Kanji characters are processed at the same character pitch. Some processors are capable of printing English characters in a somewhat proportional manner.

On the other hand, a high-performance character processor having an electronic function of composition, for example, proposed in earlier applications by the same applicant (Ser. No. 797,831 filed on Nov. 13, 1985 and Ser. No. 935,382 filed on Nov. 26, 1986), is capable of setting a variable character pitch for each character and frame processing, so that it is capable of printing and outputting the same document as that prepared by the simple word processor.

Figure 9:
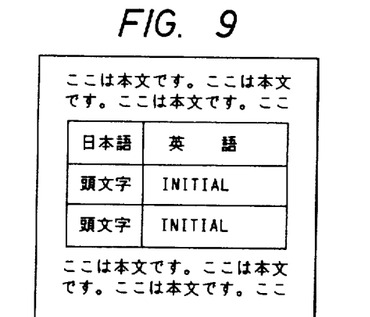
FIG. 9 illustrates an example of a document prepared by a word processor.
Figure 10:
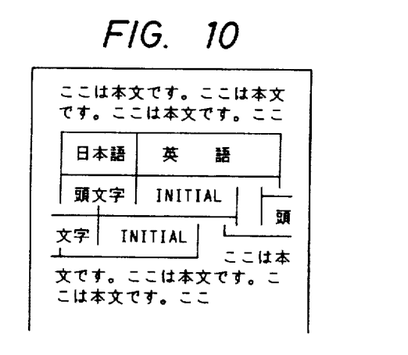
FIG. 10 illustrates an example of a document obtained by proportionally composing the document of FIG. 9 as it is.

However, if a document such as that shown in FIG. 9 and prepared by a word processor is input to a high-performance device of this type, its ruled lines and tables will be destroyed conventionally, as shown in FIG. 10. This is because the respective widths of characters of the English term "INITIAL" are composed as being variable in a proportional manner, because the number and/or position of characters contained in each line are different from those processed at a fixed pitch, and because the high- and lower-performance processors are different qualitatively in proportional processing. Other causes are that numerals and/or various brackets are processed in a manner different especially from the processing at fixed pitches and that the high- and lower-performance processors are different functionally in word wrapping. Thus conventional methods of processing only characters and codes in a simple manner cannot utilize a document, as it is, containing tables prepared by word processors. In order to prevent these problems, there is proposed a method which includes the steps of adding special-purpose control information to information input by a word processor to form a document, and inputting the document to a high-performance processor of the above type to cause the same to interpret the control information for composition. To this end, input operations other than those on the word processor must be mastered. For these drawbacks, especially in handling tables, the relationship between a Japanese word processor and a corresponding higher-performance document processor having an electronic function of composition is similar to that between an English word processor and a corresponding higher-performance document processor.

SUMMARY OF THE INVENTION

This invention is therefore intended to eliminate the above drawbacks.

It is an object of this invention to provide a document processor having an automatic composing function capable of using a document containing a table input by a word processor or the like without the need for editing the document greatly which function includes means for recognizing the table in the document prepared by the word processor or the like without a special command contained in the document, means operated by the operator for indicating a table which cannot be recognized, as a table, and means for electronically composing a table so as to maintain the original form of the table.

In order to solve the above problems, the present invention provides a document processor which includes means for recognizing a table in an input document, means for registering the recognized table, means for composing the document with the original form of the registered table being maintained, whereby composition of the document is performed with the original form of the table being maintained.

In order to solve the above problems, the present invention provides a document processor which includes means for indicating a table in an input document as a table, means for registering the indicated table, and means for composing the document with the original form of the table being maintained, whereby the indication of the table causes the composition of the document to be performed with the original form of the table being maintained.

It is a further object of this invention to provide a document processor which is capable of easily recognizing an outer frame of a table in document information input by a different kind of document processor.

It is a still further object of this invention to provide a document processor which is capable of easily recognizing a rectangular area in a table in document information input by a different kind of word processor.

It is a further object of this invention to provide a document processor which when it has found an incomplete table from document information input by a different kind of a document processor, is capable of outputting document information containing the table at the same pitch as the different kind of processor.

It is a still further object of this invention to provide a document processor which is capable of updating information on positions and attributes automatically on the basis of corrections such as deletion, addition of ruled-lines and replacement of one cell with another.

It is another object of this invention to provide a document processor which is capable of easily performing editing such as change of a character type in a cell in units of a cell.

It is further object of this invention to provide a method which is capable of easily searching tables in input document information.

DETAILED DESCRIPTION OF PREFERRED EMBODIMENT

A preferred embodiment of this invention will now be described in more detail with reference to the drawings.

(System Block Diagram)

Figure 1:
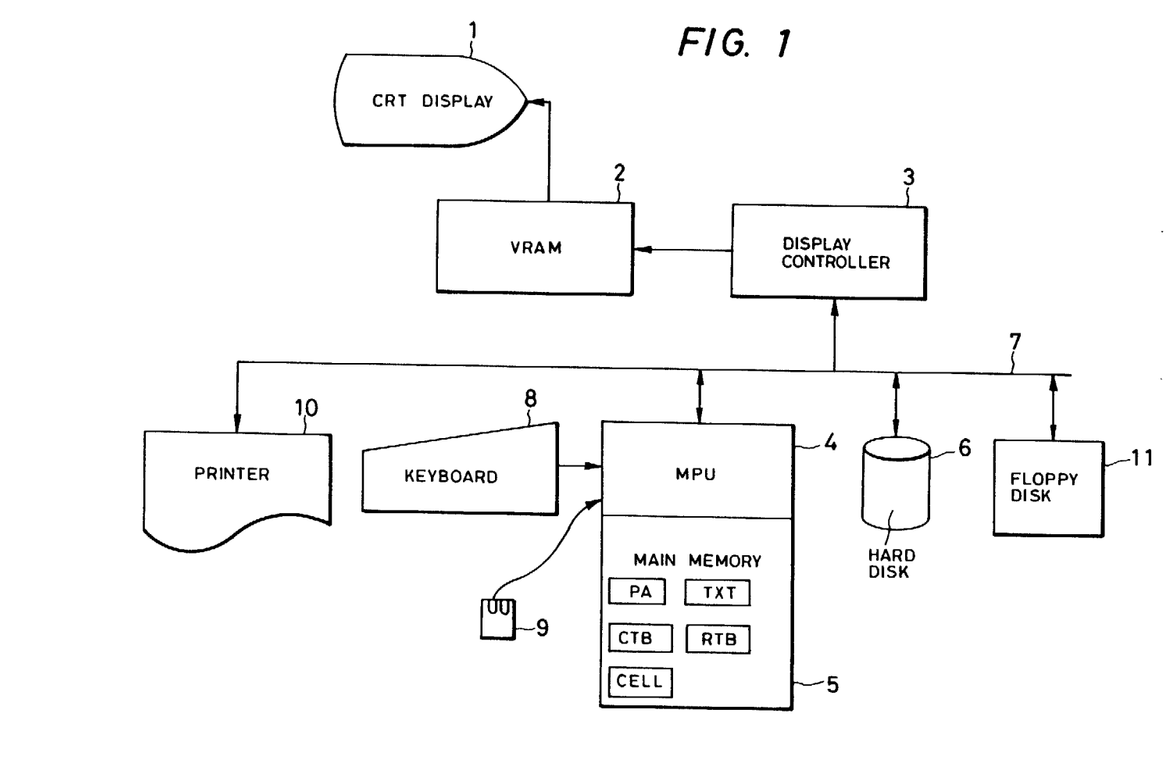
FIG. 1 is a block diagram of a document processor of one embodiment of the invention.

FIG. 1 is a system block diagram of a document processor which is one embodiment of this invention. Of course, a document referred to in this invention may include an image, a table, a drawing and/or a graph. In FIG. 1, reference numeral 1 denotes a CRT display used in a raster-scanned display system, 2 denotes a video RAM (VRAM) for storing displayed pattern information for one picture, and 3 denotes a display controller which controls writing of pattern information into VRAM 2 and reading of information into the CRT. Reference numeral 5 denotes a main memory which includes a program area PA which stores control programs obeying the flowchart of FIG. 4, a document data storage area TXT, and table areas CTB, RTB and CELL which store data on tables. Reference numeral 4 denotes a microprocessor (MPU) which mainly controls the whole system and to which are connected a keyboard 8 which inputs character and data, etc., into MPU 4 and a pointing device (PD) 9 which designates positions on the CRT. Reference numeral 6 denotes a hard disc device which stores document files and characters fonts therein. Reference numeral 10 denotes a printer which outputs a prepared document. Reference numeral 11 denotes a floppy disc device which receives a document containing floppy disc prepared by a word processor. These respective component blocks are interconnected by an I/O bus 7.

Figure 2:
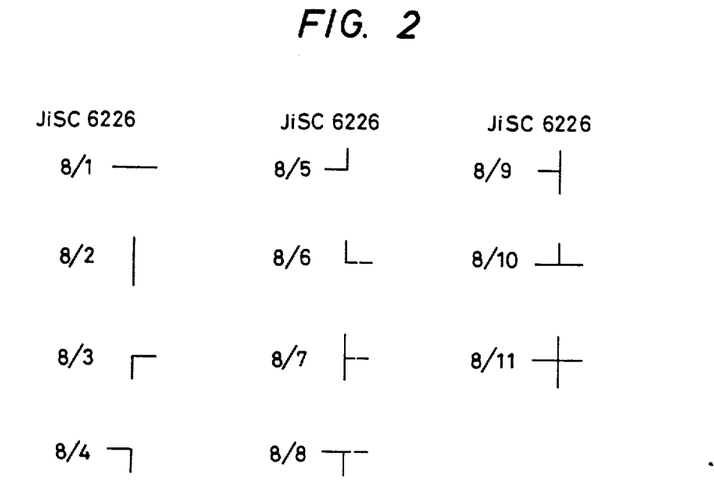
FIG. 2 illustrates some ruled-line element codes according to a JISC6226 code.
Figure 3:
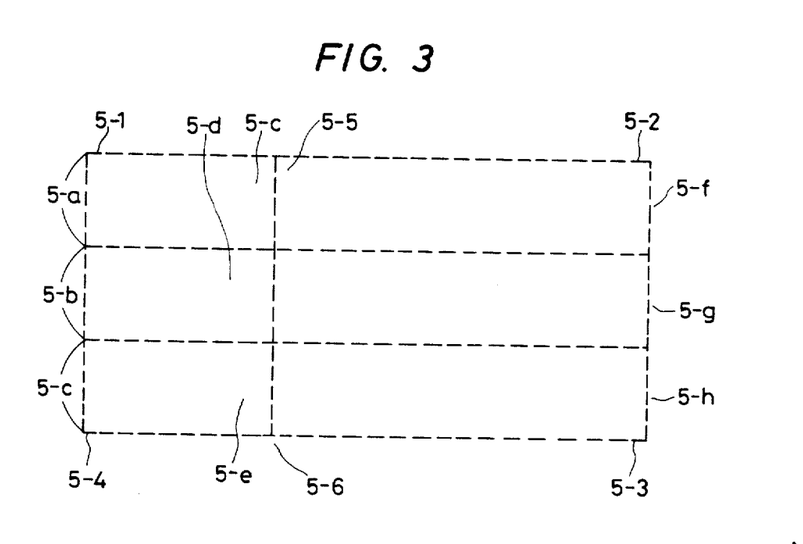
FIG. 3 illustrates decomposed rule-line element codes of the ruled-lines of FIG. 9.

Handling a document which contains a table such as is shown in FIG. 9 and prepared by a word processor will now be described. A document input by the word processor is read page by page from floppy disc device 11 to the document storage area TXT of main memory 5. A ruled-line frame among texts such as that shown in FIG. 9 is generally constituted by JISC6226 ruled-line element codes such as those shown in FIG. 2. FIG. 3 shows the ruled-line frame of FIG. 9 in the corresponding decomposed types of ruled-line element codes for easy understanding.

(Processing of a Table)

The processing of a table will now be described in accordance with FIG. 4.

(Outer-frame Search)

First, the frame of a table is searched at step 6-1. This is a first processing step which includes determining a table portion, including searching the outermost frame of the table. In more detail, a page is searched from its head to its end for a (8/3) code. If this code is not found, it is determined that the page does not contain a table and the processing of FIG. 4 ends at step 6-1. If the code (the 5-1 portion in FIG. 3) is found, characters are checked one by one from that position. The acceptable codes are (8/1), (8/8), (8/4) alone. If codes other than those codes are met, it is determined that the portion met at present is not part of the table and the search of (8/3) is again started from that position. When a (8/4) code (the position 5-2 in FIG. 3) is found, characters are checked one by one downward therefrom (from the same printing position). The acceptable codes are (8/2), (8/9), (8/5). If a code other than those codes is met, searching at step 6-1 is again started from the (8/4) portion. Thereafter, similarly, a check is performed which returns through 5-3, 5-4 to 5-1 of FIG. 3. When this check ends, the portion surrounded by the checked areas is recognized as a candidate for the table frame and a shift is made to step 602.

(Vertical Ruled-line Registration)

At step 6-2, the vertical ruled-lines contained 25 in the candidate for the table frame are registered in vertical ruled-line table CTB in main memory 5. The details of this table CTB are shown in FIG. 5. In registration, connected vertical ruled-lines are as a rule considered as one line, but if the one vertical connected ruled-line intersects a horizontal ruled-line, the upper and lower portions of the vertical ruled-line produced by the intersection are regarded as separate ruled-lines and are registered as such. For example, in FIG. 3, nine vertical ruled-lines 5-a to 5-h are registered. In more detail, first, characters are checked one by one sequentially downwardly on the page from the position where there is (8/3) (the portion 5-1 in FIG. 3). If a ruled-line element code containing a vertical ruled-line exists, it is registered on the table. At this time, if there is (8/5), (8/6) or (8/10), the vertical ruled-line will end thereat, so that the x-coordinates and y-coordinates of the upper and lower ends of the ruled line are also registered. If (8/2), (8/3), (8/4), (8/7), (8/8), (8/9) or (8/11) is met, the ruled-line may be continuous, so that the y- coordinates of the ruled-line thereat are not registered. (If (8/7), (8/9) or (8/11) is met, one vertical ruled-line is registered and a ruled-line whose lower end is not yet determined is registered.) When a ruled-line whose lower end is not determined is registered, sequential checks are performed so long as the character is at (8/2), while when a code other than the (8/2) is met, the registration of the lower end is performed. At this time, in the case of (8/7), (8/9) or (8/11) being met, a further ruled-line whose lower end is not determined is registered. In this way, ruled-lines are registered on the vertical ruled-line table while such a check is being performed. When the row of (8/6) (the portion 5-4 in FIG. 3) is met, the processing on this row ends. Thereafter, similarly, check and registration are performed sequentially from a row on the right of (8/3) (the portion 5-1 in FIG. 3) to the row (8/4) (the portion 5-2 in FIG. 3) to end the processing of the vertical ruled-lines at step 6-2.

(Horizontal Ruled-line Registration)

At step 6-3, similar processing is performed on horizontal ruled-lines to perform similar registration on horizontal ruled-line table RTB in main memory 5.

The ruled-lines in the ruled-line table at the processing of step 6-2 and 6-3 are all table ruled-lines in attribute. If, of course, ruled-line element codes other than those in FIG. 2 are used, the attributes of ruled-lines obeying the codes are registered.

(Determination of a Rectangular Area)

At step 6-4, it is checked on the basis of the ruled-line tables CTB, RTB registered as described above whether or not all the areas formed by ruled-lines in a table frame are rectangular. First, vertical ruled-lines are taken one by one sequentially from the vertical ruled-line table CTB to examine the connection with another vertical ruled-line. If it is connected, the whole is regarded as one and both ends of the vertical ruled-line are sought. It is then checked on the horizontal ruled-line table RTB whether or not there are two horizontal ruled-lines extending from each of both ends of the vertical ruled-line (the position of 5-5 and 5-6 in FIG. 3). If not, it is checked whether or not the end is the point 5-1, 5-2, 5-3 or 5-4 in FIG. 3. If not, there is a non-rectangular area, so that the processing of FIG. 6 ends by determining that a candidate for the table frame is not a table. Similarly, all the ruled-lines registered on the vertical ruled-line table CTB are checked. When this check ends, the ruled-lines are taken one by one sequentially from the horizontal ruled-line table RTB and a similar check is performed. When this check ends, all the resulting portions divided by the ruled-lines within the table frame can be regarded as being rectangular.

(Registration of cell Data)

Finally, cell data is registered at step 6-5. In this processing, horizontal ruled-lines are taken one by one sequentially from the horizontal ruled-line table RTB and checked on the vertical ruled-line table CTB whether or not there is a vertical ruled-line extending downwardly from each of the ends of the taken horizontal ruled-line. If not, there should be a horizontal ruled-line connecting to one end of the taken horizontal ruled-line. The connecting ruled-line is then searched from the horizontal ruled-line table RTB and regarded as one together with the taken ruled-line, and a vertical ruled-line extending downwardly from the other end point of the searched horizontal ruled-line is again searched. If there is a vertical ruled-line, that end point becomes one end of a cell. In this way, the right and left ends of the cell are determined and then the lower end of the cell is determined on the basis of a vertical ruled-line at one of the right and left ends of the cell. In this case, the lower end of the vertical ruled-line is handled as an end point and a horizontal ruled-line extending from the end point in the direction in which the original horizontal line extends is searched from the horizontal ruled-line table RTB. If any, that position of the end point is the lower end of the cell. If not, there should be a vertical ruled-line having the end point as its upper end point. This vertical ruled-line is searched from the vertical ruled-line table CTB. Similarly, the horizontal ruled-line table RTB is searched on the lower end point of the vertical ruled-line. Repetition of the above operations will determine the lower end of the cell.

Figure 5A:
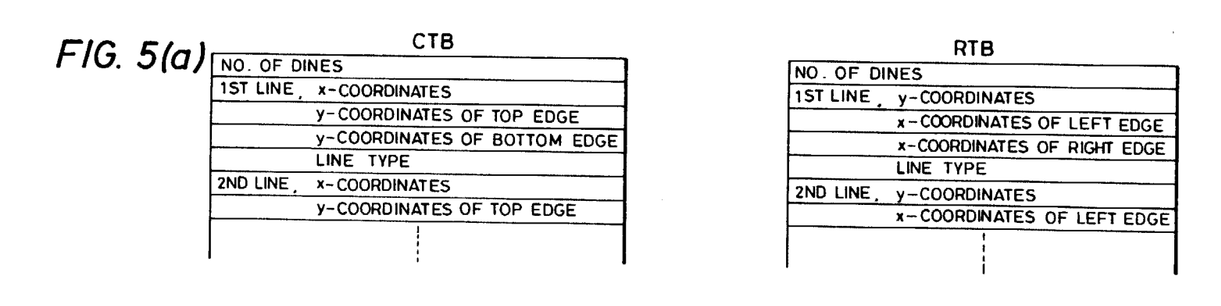
FIGS. 5(a) and 5(b) show the formats of a ruled-line table and a cell table.
Figure 5B:
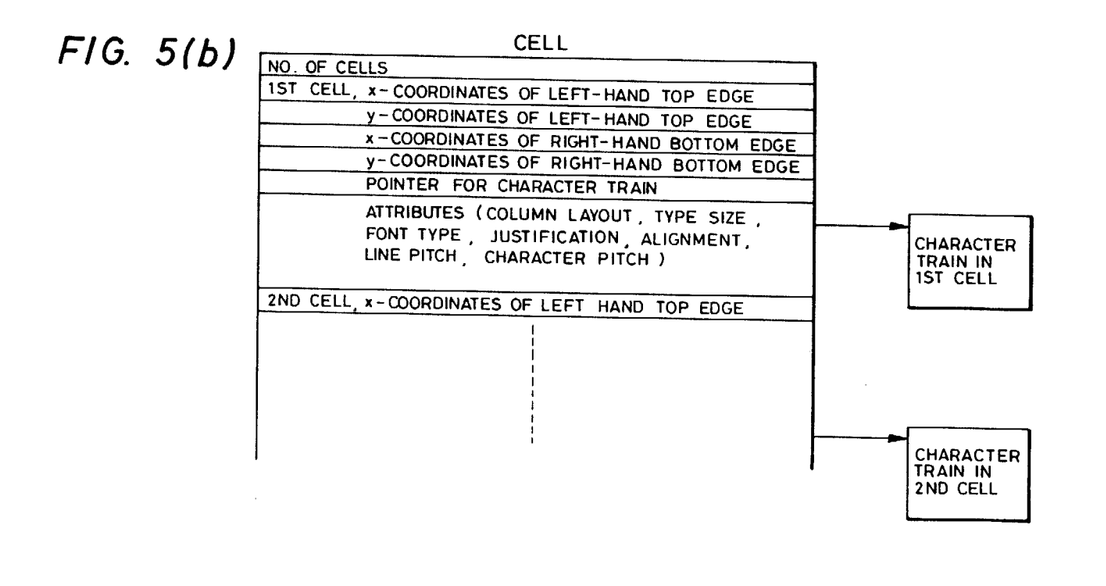

If the range of the cell is determined, it is registered at the x- and y-coordinates of the left-hand top edge, and the x- and y-coordinates of the right-hand bottom edge on the cell table CELL in main memory 5, the train of characters contained in the cell is then determined on the basis of the range, and stored separately, and a pointer to the train of characters is registered on the cell table CELL, the details of which are shown in FIG. 5(b). Processing similar to the above is performed on ruled-lines other than the horizontal ruled-lines composing parts of the portions 5-4 to 5-3 in the horizontal ruled-line table RTB. Thus all the cells in this table are registered on the cell table CELL, as shown in FIG. 5(b), and the trains of characters contained in the cells are also determined.

Figure 4:
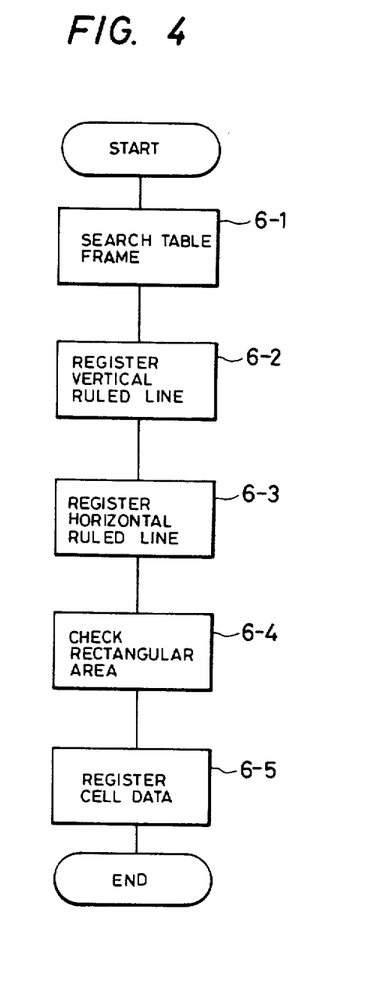
FIG. 4 is a flowchart showing a method for determining a table and prepared a table for processing.

Thus the processing on FIG. 4 ends, the table portion in the document of FIG. 9 is recognized as such, and the information on the ruled-lines and cells are all registered on the tables CTB, RTB and CELL of FIG. 5. Thus if, for this document, characters are then filled into the text area with an inhibited area defined by the frame of the table, the ruled lines of the table are formed from the tables CTB, RTB of FIG. 5, and characters for the respective cells are filled into the respective cells for composition on the basis of the information of the cell table CELL, an output will be produced in which a document is composed with the form of a table such as that shown in FIG. 6 being maintained. Thus a document in which the outer frame of a table such as that shown in FIG. 9 is rectangular and in which all the resulting areas divided by the internal ruled-lines are rectangular can be utilized as it is.

(Incomplete Table)

Figure 7:
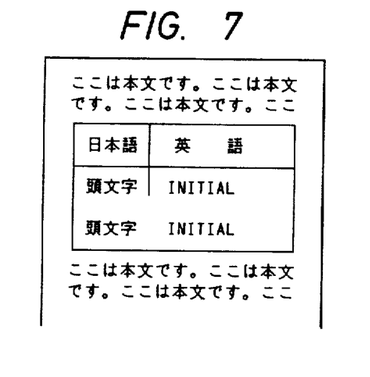
FIGS. 7 and 8 each show an example of a document containing a table prepared by a word processor.

Handling of a table having an incomplete form such as that shown in FIG. 7 will now be described. For such a document, while it is being checked at step 6-4 of FIG. 4 whether or not the areas constituted by ruled-lines are all rectangular, an incomplete table can be determined on a page. In such a case, that page of the document is displayed at a fixed pitch or at a set pitch by a word processor onto the CRT 1 as in a word processor. Alternatively, a message may be displayed. The operator operates pointing device 9 to add or eliminate ruled-lines on the CRT 1 to form a complete table.

(Addition of Ruled-lines)

In more detail, in addition of a ruled-line, both ends of the line are displayed. When it is done, the system determines from the coordinates of both the ends whether a vertical ruled-line or a horizontal ruled-line is to be added. If a vertical ruled-line is to be added, all the vertical ruled-lines connected to that ruled-line, both ends of which have been displaced, are taken from the vertical ruled-line table CTB and are regarded as one together. Horizontal ruled-lines intersecting the regarded-as-one ruled-lines are searched from the horizontal ruled-line table RTB, and the resulting vertical ruled-lines divided by those horizontal ruled-line are registered on the vertical ruled-line table CTB. Addition of horizontal ruled-lines are performed similarly.

(Deletion of Ruled-lines)

In the deletion of ruled-lines, a point on a ruled-line to be deleted is indicated. The system searches and eliminates the ruled-line indicated by the coordinates of the point in and from the ruled-line tables CTB, RTB. If the eliminated line is a vertical ruled-line, all the horizontal ruled-lines intersecting the eliminated vertical ruled-line are taken from the horizontal ruled-line table RTB, all other horizontal ruled-lines connecting sequentially to each of the horizontal ruled-line intersecting the vertical ruled-line are regarded as one, the vertical ruled-line table CTB is again searched to perform division, and the resulting vertical ruled-line components are re-registered on the table. When the addition and deletion of ruled-lines end in the manner mentioned above, and if the processing is performed again from the step 6-4 of FIG. 4, a document having a table such as that shown in FIG. 7 can be output as in FIG. 6.

(A Table without ruled-lines)

Figure 8:
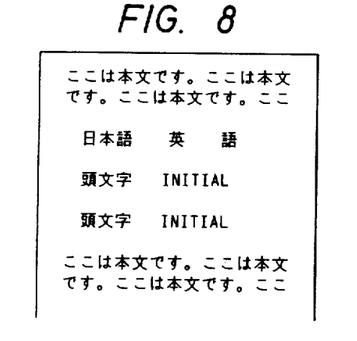

Processing a document having a table without ruled-lines as shown in FIG. 8 will now be described. Such document would be processed as not appearing at step 6-1 of FIG. 4. Therefore, in such a case, the operator instructs that page to be displayed as in a word processor and points out the frame of a table causing pointing device 9 to point out the table frame by indicating the left-hand top and right-hand bottom points of the frame. The subsequent steps may include the addition and elimination of ruled-lines as in FIG. 7. By such processing, a table without ruled-lines as shown in FIG. 8 can be output as in FIG. 6. If ruled-lines are designated as hidden so as not to be printed, editing of cells to be described later will be easy.

(Change of Ruled-lines and cells)

Figure 6:
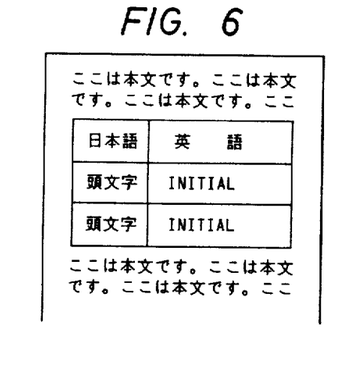
FIG. 6 shows an example of the output of the document of FIG. 9 composed with the form of a table being maintained.

The tables CTB, RTB have structures shown in FIG. 5, so that it is possible by a simple designation to obtain an output shown in FIG. 6, designate the attributes of ruled-lines to change ruled-lines to thicker ones, process ruled-lines so as not to be printed, change the size and style of characters in a cell, and/or compose a document in a vertical type, or it is possible to maintain the document as it is.

Namely, by handling as one cell a frame defined by a cell table CELL, the editing and composition of a document can be performed with the original form of the document prepared at a designated or fixed pitch by a word processor or the like being maintained. In addition, a frame defined by the cell table CELL can be handled as one cell, so that each cell can be easily replaced with another cell. As described above, by the change, addition and deletion of ruled-lines, and change of cells (replacement), the tables shown in FIGS. 5(a), (b), (c) are automatically updated.

According to this invention, as described above, a document can be composed and output with the form of a table within a word processor being maintained, so that an inexpensive word processor can take charge of inputting and reproducing a document containing tables while an expensive automatic composing and outputting processor can centrally use its composing and outputting functional portions which are the features of the device to thereby reduce the overall cost and improve throughput.

As described above, according to this invention, after document data to be handled as a table prepared by a word processor is input to a document processor according to this invention, the table can be designated, so that if document data which is desired to be handled solely as a table is prepared without forming the table by the word processor, the document processor according to this invention can designate the table and compose a document with the form of the table being maintained.

As described above, according to this invention, a document processor is provided which is capable of editing and correcting characters in units of a cell, and which does not affect the portions outside the cells or other cells.

As described above, it is possible to easily recognize an outer frame of a table from input document information.

As described above, it is possible to easily recognize the rectangular areas in a table.

As described above, when an incomplete table is determined from input document information, it is possible to output document information containing the table at its original pitch.

According to this invention, it is also possible to automatically update information on positions and attributes on the basis of deletion and addition of ruled-lines and replacement of cells with each other.

According to this invention, editing such as change of character types in a cell in units of a cell is easy.

According to this invention, it is possible to provide an algorithm which is capable of easily searching a table in document information.

We claim:

1. A document processor for editing an input document and outputting the resulting information as a document, comprising:
   input means for inputting a document including a figure pattern;
   means for recognizing a table in the document input by said input means;
   means for storing the table recognized by said recognizing means in a memory by relating a plurality of cells constituting the table with associated respective coordinate data; and
   means for composing a document such that the original form of the table stored by said storing means is maintained.

2. A document processor according to claim 1, wherein said recognizing means recognized at least a pair of codes representing the beginning and end of the table among codes representing the table.

3. A document processor according to claim 1, wherein the storing means stores in the memory data relating to horizontal lines constituting a part of the table, data representing the cells constituting part of the table, and character data such as characters present in each of the cells constituting part of the table.

4. A document processor for editing an input document and outputting the resulting information as a document, comprising:
   input means for inputting a document including a figure pattern;
   means for recognizing a table in the document input by said input means;
   means for storing the table recognized by said recognizing means in a memory by relating a plurality of cells constituting the table with associated respective coordinate data;
   means for editing a document in units of a cell of the plurality of cells stored by said storing means, wherein said editing means has the function of replacing two cells with each other, and
   means for updating information representing a cell stored by said storing means in accordance with the editing by said editing means.

5. A document processor according to claim 4, wherein said recognizing means recognized at least a pair of codes representing the beginning and end of the table among codes representing the table.

6. A document processor according to claim 4, wherein said storing means stored in the memory data relating to horizontal lines constituting a part of the table, data representing cells constituting part of the table, and character data such as characters present in each of the cells constituting part of the table.

7. A method of recognizing a table in document information, comprising the steps of:

searching for the left-hand top edge of the table in the direction of lines in the document information;

searching for at least information on the right-hand top edge of the table in the direction of lines in the document information after the left-hand top edge is searched;

searching for at least information on the right-hand bottom edge of the table downwardly from the same position as the right-hand top edge in the direction of the lines after information on the right-hand top edge of the table has been searched;

the step of searching for at least information on the right-hand bottom edge of the table including the step of searching the left-hand top edge of the table again from the position of the searched right-hand top edge information when information other than that representing the right edge of the table is identified.

8. A method according to claim 7, wherein the step of searching the left-hand top edge in the direction of the lines includes searching information while updating lines sequentially in accordance with the starting of a new line of document information.

9. A document processor comprising:

input means for receiving document information including a table without frame lines;

means for designating a portion of a frame for the table by designating at least two of the edge points of the frame to be added to the table contained in document information received by the input means and for designating a plurality of frame lines defining a plurality of cells of the table;

means for designating attributes of a frame line between the edge points designated by said designating means and for preventing the frame lines from being printed; and means for editing the document information in units of a cell defined by the plurality of frame lines even after said means for designating the attributes has designated that the frame lines are not to be printed when the document information is output.

10. A document processor according to claim 9, further comprising:

memory means storing information on horizontal lines constituting part of the frame lines and information on the cells defined by the frame lines.

11. A document processor according to claim 9, wherein said editing means designated the attributes of characters in each cell.

12. A document processor for editing an input document and outputting the resulting information as a document, comprising:

input means for inputting a document including a figure pattern;

means for recognizing a table in the document input by said input means;

means for storing the table recognized by said recognizing means in a memory by relating a plurality of cells constituting the table with associated respective coordinate data;

means for editing a document in units of a cell of the plurality of cells stored by said storing means, wherein said editing means has the function of designating the attributes of characters in each cell; and means for updating information representing a cell stored by said storing means in accordance with the editing by said editing means.

13. A document processor comprising:

input means for receiving document information including a table without frame lines;

first designating means for designating a portion of a frame for the table by designating at least two of the edge points of the frame to be added to the table contained in document information received by said input means and for designating a plurality of frame lines defining a plurality of cells of the table;

second designating means for designating attributes of a frame line between the edge points designated by said designating means; and control means for, in response to the attributes of the frame line designated by said second designating means, controlling this frame line to have a different output style from other frame lines.

* * * * *

UNITED STATES PATENT AND TRADEMARK OFFICE
CERTIFICATE OF CORRECTION

PATENT NO. : 4,953,108

DATED : August 28, 1990

INVENTOR(S) : Takahiro Kato et al.

It is certified that error appears in the above-identified patent and that said Letters Patent is hereby corrected as shown below:

FIGURE 5(a):

"NO. OF DINES" should read --NO. OF LINES-- (both occurrences).

COLUMN 2:

Line 57, "rule-line" should read --ruled-line--.

Line 60, "prepared" should read --preparing--.

COLUMN 3:

Line 67, "(8/1), (8/8), ⌐(8/4)" should read -- -(8/1), ⌐(8/8), ⌐(8/4)--.

COLUMN 4:

Line 2, "(8/3)" should read --⌐(8/3)-- and "(8/4)" should read -- ⌐(8/4)--.

Line 5, "(8/2)," should read --|(8/2),--.

Line 6, "(8/9), (8/5)" should read -- ⊣(8/9), ⌐(8/5)--.

Line 7, "(8/4)" should read --⌐(8/4)--.

Line 12, "step 602." should read --step 6-2.--

UNITED STATES PATENT AND TRADEMARK OFFICE
CERTIFICATE OF CORRECTION

PATENT NO. : 4,953,108

DATED : August 28, 1990

INVENTOR(S) : Takahiro Kato et al.

It is certified that error appears in the above-identified patent and that said Letters Patent is hereby corrected as shown below:

COLUMN 4:

Line 15, "25" should be deleted.

Line 28, "(8/3)" should read --⌐(8/3)--.

Line 30, "(8/5), (8/6)" should read --⌐(8/5), ⌐(8/6)--.

Line 31, "(8/10)" should read -- ⊥(8/10)--.

Line 33, "(8/2)," should read --|(8/2)--.

Line 34, "(8/3), (8/4), (8/7), (8/8), (8/9) or (8/11)" should read --⌐(8/3), ⌐(8/4), ⊢(8/7), ⊤(8/8), ⊣(8/9) or +(8/11)--.

Line 36, "(8/7)" should read --⊢ (8/7)--.

Line 37, "(8/9) or (8/11)" should read --⊣(8/9), or +(8/11)--.

Line 41, "(8/2)," should read --|(8/2),--.

Line 42, "(8/2)" should read --|(8/2)--.

Line 44, "(8/7), (8/9) or (8/11)" should read --⊢ (8/7), ⊣ (8/9) or + (8/11)--.

Line 48, "(8/6)" should read --⌐(8/6)--.

Line 51, "(8/3)" should read --⌐(8/3)--.

Line 52, "(8/4)" should read --⌐(8/4)--.

UNITED STATES PATENT AND TRADEMARK OFFICE
CERTIFICATE OF CORRECTION

PATENT NO. : 4,953,108

DATED : August 28, 1990

INVENTOR(S) : Takahiro Kato et al.

It is certified that error appears in the above-identified patent and that said Letters Patent is hereby corrected as shown below:

COLUMN 4:

Line 57, "main memory 5, the" should read --main memory 5. The--.

COLUMN 6:

Line 41, "displaced," should read --displayed,--.

Line 46, "ruled-line" should read --ruled-lines--.

Line 59, "ruled-line" should read --ruled-lines--.

COLUMN 8:

Line 30, "recognized" should read --recognizes--.

Line 53, "other," should read --other;--.

Line 58, "recognized" should read --recognizes--.

UNITED STATES PATENT AND TRADEMARK OFFICE
CERTIFICATE OF CORRECTION

PATENT NO. : 4,953,108
DATED : August 28, 1990
INVENTOR(S) : Takahiro Kato et al.

Page 4 of 4

It is certified that error appears in the above-identified patent and that said Letters Patent is hereby corrected as shown below:

COLUMN 8:

Line 62, "stored" should read --stores--.

COLUMN 10:

Line 5, "designated" should read --designates--.

Signed and Sealed this

Twenty-first Day of July, 1992

Attest:

DOUGLAS B. COMER

Attesting Officer

Acting Commissioner of Patents and Trademarks